Sept. 19, 1961 E. J. EVANS 3,000,072
PROCESS OF CONTAINING AND FIXING FISSION PRODUCTS
Filed Aug. 20, 1959
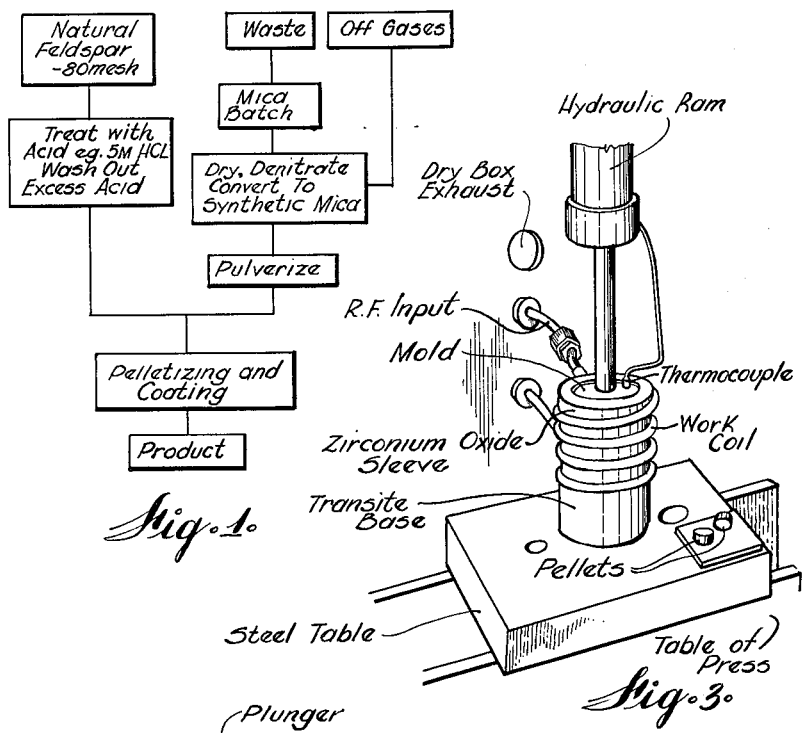
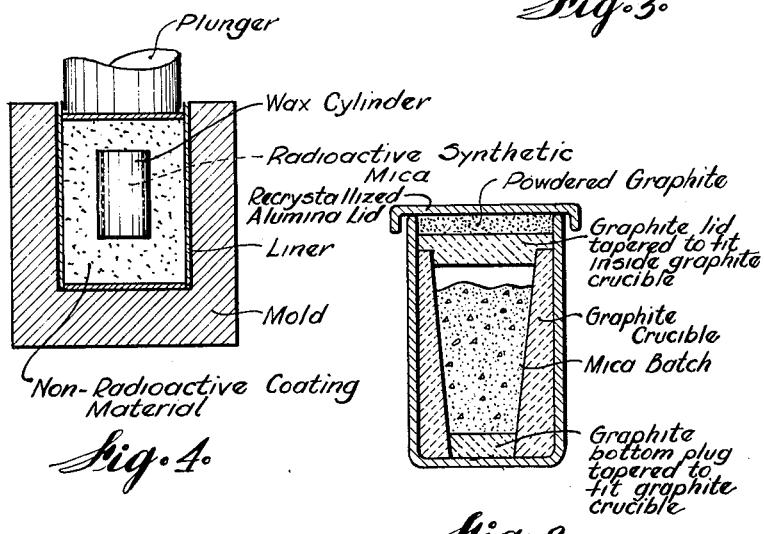
INVENTOR
Edward J. Evans
BY Alex. E. MacRae
ATTORNEY

United States Patent Office 3,000,072
Patented Sept. 19, 1961

---

3,000,072
PROCESS OF CONTAINING AND FIXING FISSION PRODUCTS
Edward J. Evans, Ottawa, Ontario, Canada, assignor to Atomic Energy of Canada Limited, Ottawa, Ontario, Canada, a company
Filed Aug. 20, 1959, Ser. No. 835,127
5 Claims. (Cl. 25—156)

This invention relates to a process of incorporating fission products into synthetic mica for the purpose of safe disposal of the fission products in a solid having long-term weathering properties and to provide a product in form as a radiation source.

More particularly the object of the invention is to incorporate the fission products by solid state reaction in a synthetic mica to form a long-term weatherproof solid.

The process of the invention will be described with reference to the accompanying drawing in which, FIGURE 1 is an illustrative flow sheet.

FIGURE 2 is a sectional view of a crucible for forming the synthetic mica.

FIGURE 3 illustrates a pellet forming device, and

FIGURE 4 is a diagrammatic view, partly in section, indicating the manner of coating.

In the flow sheet of FIGURE 1 the term "waste" means the product formed upon dissolving a sheathed fuel rod, used in a nuclear reactor, in nitric acid. It may be one or more separated radioactive isotopes. The term "mica batch" means the compounds which combine to form a fluor-phlogopite mica. Potassium fluor-phlogopite is the preferred mica. $KMg_3AlSi_3O_{10}F_2$ represents the mole ratio of the elements used in the batch. It is known that the layers or plates of such mica are separated and held together by the potassium. In the operation of the present process, as the batch material is heated with the fission product material at a temperature not less than 900° C. and less than the melting point of the batch material the fission products are incorporated in the mica. The melting point of the batch material may be as high as 1450° C. In the structure of the synthetic mica formed it appears that fission products cesium and strontium take the place of the potassium and/or magnesium as it appears in natural fluor-phlogopite. The resulting mass containing the fission products is readily pulverized.

As shown in the flow sheet the mixture of mica batch and fission products material is dried and heated to form the synthetic mica. A temperature of 1000° C. has proven satisfactory. As stated the temperature is less than the melting point of the batch material and it should not be less than about 900° C. The incorporation of the fission products in the synthetic mica thus takes place in the solids state. FIGURE 2 illustrates a crucible in which the synthetic mica is formed.

The mass is then pulverized and formed into pellets, as illustrated in FIGURE 3. When the mass was heated at a temperature of about 1275° C. a pressure of about 1000 p.s.i. was effective. The pelletizing apparatus is preferably contained in a dry box in which an inert atmosphere is maintained to avoid deterioration of the mould.

In order to insure against release of fission products from the pellets a coating of inactive material is hot pressed about the pellets as illustrated in FIGURE 4. As inactive material for the coating the following may be used: synthetic mica, natural potassium feldspar, natural feldspar treated with hydrochloric acid (a hydrogen substituted feldspar) montmorillonite, vermiculite, kaolinite, zeolites, ceramic glaze or other ceramic material. The pellets and surrounding inactive coating material were subjected to a pressure of about 1000 p.s.i. at a temperature of 1175° C.

The operation of the process as used is more particularly described as follows.

The mica batch was formed by compounds to provide the correct molar proportions for formation of the desired synthetic mica, as illustrated by the formula $$KMg_3AlSi_3O_{10}F_2$$

In practice an extra one-half mole of fluoride is used to compensate for losses by volatilization. The fission product was mixed with a measured quantity of the mica batch and the mixture dried under an infra-red lamp. The dried mixture was heated in a crucible, as illustrated in FIGURE 2, at a temperature of 1000° C. to cause the solid state reaction incorporating the fission product in the synthetic mica formed.

The product was crushed and formed into pellets, as illustrated in FIGURE 3, by heating the pulverized material to a temperature of about 1275° C. under a pressure of about 1000 p.s.i.

In the preferred procedure illustrated in FIGURE 4 the pulverized mass was formed into pellets and coated with the non-radioactive material. As shown the mould contains a liner which prevents the pellet from adhering to the mould and plunger. A molybdenum liner is effective. Inactive material is placed in the bottom of the mould, an open bottom wax cylinder is centrally located, filled with the radioactive synthetic mica powder, and completely surrounded with inactive material to provide a coating of the desired thickness on the pellet. The mould is heated at a temperature of not substantially less than 900° C. and less than the melting point of the synthetic mica. The melting point of fluor-phlogopite is about 1350° C. The mica and coating material is then subjected to a pressure of not substantially less than 1000 p.s.i. to produce a coated pelletized synthetic mica. The coating prevents release of fission products from the pellets.

Pellets, containing radioactive cesium coated with inactive acid-leached feldspar prepared by hot pressing at 1175° C. at 1000 p.s.i. permitted cesium to leach at a rate of about $1\times10^{-7}$% per day from distilled water after the first ten days of leaching. Identical pellets without the coating leached at the rate of $5\times10^{-5}$% per day following an initial twenty day leaching period. Thus the coating gave additional protection of more than one hundred-fold.

What is claimed is:

1. A method of containing and fixing fission products which comprises mixing fission product material with the constituents substantially in molar proportions to form synthetic mica, heating the mixture at a temperature below its melting point and not substantially less than 900° C., pulverizing the product and compressing the pulverized product into pellets at a temperature below the melting point of the mica and a pressure of not substantially less than 1000 p.s.i.

2. The process defined in claim 1 wherein the pellets are coated under pressure with a non-radioactive siliceous material.

3. The process defined in claim 1 wherein the synthetic mica is fluor-phlogopite.

4. A process of containing and fixing fission products which comprises mixing fission product material with constituents to form fluor-phlogopite, heating the mixture at a temperature below its melting point and not substantially less than 900° C. to form synthetic mica, pulverizing the product, surrounding portions of the pulverized mica with non-radioactive siliceous material and subjecting the coated portions to a pressure not substantially less than 1000 p.s.i. at a temperature below the melting point of the mica to form pellets.

5. The process defined in claim 4 wherein an excess of fluoride is incorporated in the constituents forming the synthetic mica.

References Cited in the file of this patent

UNITED STATES PATENTS

| | | |
|---|---|---|
| 2,918,700 | Hatch | Dec. 29, 1959 |
| 2,918,717 | Struxness et al. | Dec. 29, 1959 |

OTHER REFERENCES

U.N. Publication, Peaceful Uses of Atomic Energy, vol. 18, September 1958, pp. 154–155, 441.